US012786712B2

(12) United States Patent
Kweon et al.

(10) Patent No.: US 12,786,712 B2
(45) Date of Patent: Nov. 3, 2026

(54) METHOD AND DEVICE FOR AUTHORIZATION BASED ON UPF IN WIRELESS COMMUNICATION SYSTEM

(71) Applicant: Samsung Electronics Co., Ltd., Suwon-si (KR)

(72) Inventors: Kisuk Kweon, Suwon-si (KR); Naman Gupta, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 231 days.

(21) Appl. No.: 18/504,536

(22) Filed: Nov. 8, 2023

(65) Prior Publication Data

US 2024/0155343 A1 May 9, 2024

(30) Foreign Application Priority Data

Nov. 9, 2022 (KR) ........................ 10-2022-0149015

(51) Int. Cl.
*H04W 12/08* (2021.01)

(52) U.S. Cl.
CPC .................................. *H04W 12/08* (2013.01)

(58) Field of Classification Search
CPC .............................. H04W 12/06; H04W 12/08
See application file for complete search history.

(56) References Cited

U.S. PATENT DOCUMENTS 11,496,581 B2 11/2022 Kweon et al.
2021/0281658 A1* 9/2021 Kweon .................. H04L 67/30
2022/0224646 A1 7/2022 Xiong
2022/0232369 A1* 7/2022 Puente Pestaña ....... H04L 67/14
2022/0312309 A1 9/2022 Han et al.
2023/0336993 A1* 10/2023 Li ......................... H04W 12/08
2024/0022898 A1* 1/2024 Ryu ...................... H04W 8/005
(Continued)

FOREIGN PATENT DOCUMENTS

KR 10-2021-0112868 A 9/2021
WO 2022/199867 A1 9/2022

OTHER PUBLICATIONS

3rd Generation Partnership Project; Technical Specification Group Services and System Aspects; Study on UPF enhancement for Exposure and SBA (Release 18), 3GPP TR 23.700-62 V1.1.0, Sep. 2, 2022.

(Continued)

*Primary Examiner* — Liton Miah
(74) *Attorney, Agent, or Firm* — Jefferson IP Law, LLP

(57) ABSTRACT

The disclosure relates to a fifth-generation (5G) or sixth-generation (6G) communication system for supporting a higher data transmission rate. A method performed by a user plane function (UPF) entity in a wireless communication system is provided. The method includes receiving, from a network entity requesting a subscription of a UPF service, a UPF service subscription request message, identifying whether an authorization of the UPF service is required and an entity associated with the authorization of the UPF service, transmitting, to the entity associated with the authorization of the UPF service, an authorization request message for the UPF service, receiving, from the entity associated with the authorization of the UPF service, an authorization response message for the UPF service.

10 Claims, 12 Drawing Sheets

(56) References Cited

U.S. PATENT DOCUMENTS

2024/0171484 A1* 5/2024 Muñoz De La Torre Alonso ....... H04L 43/062

OTHER PUBLICATIONS

3rd Generation Partnership Project; Technical Specification Group Services and System Aspects; Study on XR (Extended Reality) and media services (Release 18), 3GPP TR 23.700-60 V1.1.0, Sep. 7, 2022.

International Search Report dated Feb. 20, 2024, issued in International Application No. PCT/KR2023/017906.

China Mobile, BSF service update for session binding information update, S2-2204466, SA2 WG Meeting#151-E, E-meeting, May 6, 2022, XP052167833.

Extended European Search Report dated Nov. 10, 2025, issued in European Patent Application No. 23889153.5.

* cited by examiner

METHOD AND DEVICE FOR AUTHORIZATION BASED ON UPF IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0149015, filed on Nov. 9, 2022, in the Korean Intellectual Property Office, the disclosure of which is incorporated by reference herein its entirety.

BACKGROUND

1. Field

The disclosure relates to a wireless communication system. More particularly, the disclosure relates to a method and a device for, in order to receive a service provided by a user plane function (UPF), identifying the authority of a network function (NF) for requesting subscription to the UPF service, thereby determining to subscribe to the UPF service.

2. Description of Related Art

Fifth-generation (5G) mobile communication technologies define broad frequency bands such that high transmission rates and new services are possible, and can be implemented not only in "Sub 6 GHz" bands such as 3.5 GHz, but also in "Above 6 GHz" bands referred to as millimeter wave (mmWave) including 28 GHz and 39 GHz. In addition, it has been considered to implement sixth-generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple input multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, Layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

As various services can be provided in accordance with the description above and the development of mobile communication systems, there is a need particularly for a method to efficiently use a non-public network (NPN).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device capable of effectively providing a service in a wireless communication system.

Another aspect of the disclosure is to provide a method for, in order for a network device or an entity performing a function to use a service provided by a user plane function (UPF), when the UPF service is requested based on a user plane (UP), identifying whether the requested service requires authority, and if authority identification is required, requesting the same from an authority determination NF (for example, a policy control function (PCF), a session management function (SMF), etc.) so as to identify the authority of the NF.

Additional aspects will be set forth in part in the description which follows and, in part, will be apparent from the description, or may be learned by practice of the presented embodiments.

In accordance with an aspect of the disclosure, a method performed by a user plane function (UPF) entity in a wireless communication system is provided. The method includes receiving, from a network entity requesting a subscription of a UPF service, a UPF service subscription request message for a UPF service, identifying whether an authorization of the UPF service is required and an entity associated with the authorization of the UPF service, transmitting, to the entity associated with the authorization of the UPF service, an authorization request message for the UPF service, and receiving, from the entity associated with the authorization of the UPF service an authorization response message for the UPF service.

In accordance with another aspect of the disclosure, a method performed by a session management function (SMF) entity in a wireless communication system is provided. The methods includes receiving, from a user plane function (UPF), a message for requesting authorization of a UPF service requested by an application function (AF) entity, transmitting a message for requesting authorization of the UPF service to an entity related to the authorization of the UPF service, receiving a message indicating the authorization of the UPF service requested by the AF entity from the entity related to the authorization of the UPF service, and transmitting, to the UPF, the message indicating the authorization of the UPF service requested by the AF entity.

In accordance with another aspect of the disclosure, a user plane function (UPF) entity in a wireless communication system is provided. The UPF includes at least one transceiver, and at least one processor functionally coupled to the at least one transceiver, and configured to receive, from a network entity requesting a subscription of a UPF service, a UPF service subscription request message, identify whether authorization of the UPF service requested is required and an entity associated with the authorization of the UPF service, transmit, to the entity associated with the authorization of the UPF service, an authorization request message for the UPF service, and receive, from the entity associated with the authorization of the UPF service, an authorization response message for the UPF service.

In accordance with another aspect of the disclosure, a session management function (SMF) entity in a wireless communication system is provided. The SMF includes at least one transceiver, and at least one processor functionally coupled to the at least one transceiver, wherein the at least one processor is configured to receive, from a user plane function (UPF), a message for requesting authorization of a UPF service requested by an application function (AF) entity, transmit a message for requesting authorization of the UPF service to an entity related to the authorization of the UPF service, receive a message indicating the authorization of the UPF service requested by the AF entity from the entity related to the authorization of the UPF service, and transmit, to the UPF, the message indicating the authorization of the UPF service requested by the AF entity.

According to various embodiments of the disclosure, a device and a method capable of effectively providing a service in a wireless communication system are provided.

Other aspects, advantages, and salient features of the disclosure will become apparent to those skilled in the art from the following detailed description, which, taken in conjunction with the annexed drawings, discloses various embodiments the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
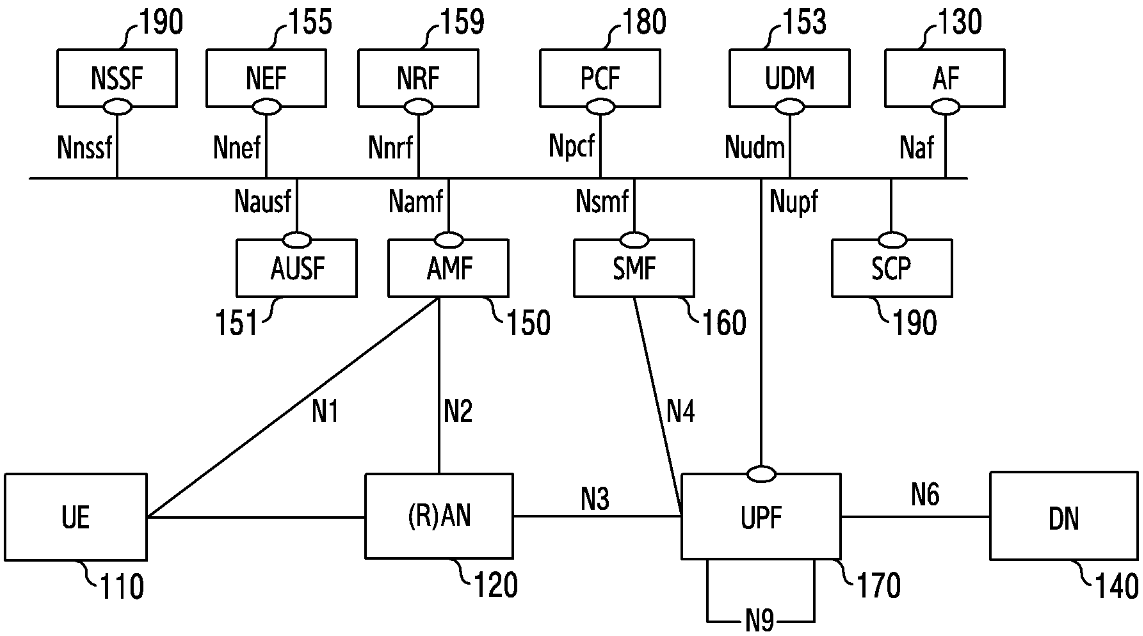
FIG. 1A illustrates a communication network including core network entities in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the following description, a base station is an entity that allocates resources to terminals, and may be at least one of a Node B, a base station (BS), an eNode B (eNB), a gNode B (gNB), a wireless access unit, a base station controller, and a node on a network. A terminal may include a user equipment (UE), a mobile station (MS), a cellular phone, a smartphone, a computer, or a multimedia system capable of performing communication functions. The embodiments may also be applied to other communication systems having similar technical backgrounds or channel types as the embodiments of the disclosure as described below. Furthermore, based on determinations by those skilled in the art, the embodiments of the disclosure may also be applied to other communication systems through some modifications without significantly departing from the scope of the disclosure.

In the following description, terms for identifying access nodes, terms referring to network entities or network functions (NFs), terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description, some of terms and names defined in 3rd generation partnership project long term evolution (3GPP LTE) standards may be used for the convenience of description. However, the disclosure is not limited by these terms and names, and may be applied in the same way to systems that conform other standards. In particular, the disclosure may be applied to the 5th generation mobile communication standards (for example, 5GS and NR).

FIG. 1A illustrates a communication network including core network entities in a wireless communication system according to an embodiment of the disclosure.

A 5G mobile communication network may include a 5G user equipment (UE) 110, a 5G radio access network (RAN) 120, and a 5G core network.

The 5G core network may include network functions, such as an access and mobility management function (AMF) 150 which provides a mobility management function of the UE, a session management function (SMF) 160 which provides a session management function, a user plane function (UPF) 170 to transfer data, a policy control function (PCF) 180 which provides a policy control function, a unified data management (UDM) 153 which provides a data management function, such as subscriber data and policy control data, or a unified data repository (UDR) which stores data of various network functions.

Referring to FIG. 1A, the terminal (user equipment (UE)) 110 may perform communication via a wireless channel, i.e., an access network, established with respect to a base station (for example, eNB or gNB). In some embodiments, the terminal 110 is a device used by a user, and may be a device configured which provides a user interface (UI). For example, the UE 110 may be a terminal equipped in a vehicle for driving. In some other embodiments, the terminal 110 may be a device which performs machine type communication (MTC) operated without involvement of a user, or may be an autonomous vehicle. A UE may be referred to as, in addition to an electronic device, a "terminal", a "vehicle terminal", a "user equipment (UE)", a "mobile station", and a "subscriber station", a "remote terminal", a "wireless terminal", a "user device", or other terms having equivalent technical meanings. As a terminal, in addition to a UE, a customer-premises equipment (CPE) or a dongle type terminal may be used. Like a UE, a customer-premises equipment may be connected to an NG-RAN node, while providing a network to another communication device (for example, a laptop).

Referring to FIG. 1A, the AMF 150 may provide a function for access and mobility management on each terminal 110 basis, and one terminal 110 may be basically connected to one AMF 150. For example, the AMF 150 may be a network function which manages mobility of the terminal. Specifically, the AMF 150 may perform at least one function among signaling between core network nodes for mobility between 3GPP access networks, an interface (N2 interface) between radio access networks (for example, 5G RAN) 120, NAS signaling with the terminal 110, identification of the SMF 160, and provisioning for transferring a session management (SM) message between the terminal 110 and the SMF 160. Some or all of the functions of the AMF 150 may be supported within a single instance of one AMF 150.

Referring to FIG. 1A, the SMF 160 may provide a session management function, and when the terminal 110 has multiple sessions, each session may be managed by a different SMF 160. For example, the SMF 160 may be a network function which manages a packet data network (PDN) connection provided to the terminal. The PDN connection may be referred to as a protocol data unit (PDU) session. Specifically, the SMF 160 may perform at least one function among session management (for example, session establishment, modification, and release including maintaining a tunnel between the UPF 170 and an access network node), selection and controlling of a user plane (UP) function, configuring traffic steering for routing of traffic to an appropriate destination by the UPF 170, termination of an SM part of a NAS message, downlink data notification (DDN), and an initiator of AN-specific SM information (for example, transferring to an access network over an N2 interface via the AMF 150). Some or all of the functions of the SMF 160 may be supported within a single instance of one SMF 160.

Referring to FIG. 1A, the PCF 180 may be a network function which applies a mobile communication operator's service policy, charging policy, and PDU session policy to the terminal. According to an embodiment, the UDM 153 may be a network function which stores information on a subscriber. According to an embodiment, the UPF 170 may be a function to serve as a gateway which transfers user data (PDU) to a data network (DN). According to an embodiment, a network repository function (NRF) 159 may perform a function of identifying an NF. According to an embodiment, an authentication server function (AUSF) 151 may perform terminal authentication in a 3GPP access network and a non-3GPP access network. According to an embodiment, a network slice selection function (NSSF) 190 may perform a function of selecting a network slice instance provided to the terminal. According to an embodiment, a DN 140 may be a data network via which the terminal transmits or receives data so as to use a network operator's service or a third party service.

In a 3GPP system, conceptual links connecting NFs in the 5G system may be referred to as reference points. A reference point may also be referred to as an interface. The following illustrates reference points (hereinafter, used interchangeably with interfaces) included in the 5G system architecture expressed across various embodiments of the disclosure.

N1: a reference point between the UE 110 and the AMF 150

N2: a reference point between the (R)AN 120 and the AMF 150

N3: a reference point between the (R)AN 120 and the UPF 170

N4: a reference point between the SMF 160 and the UPF 170

N5: a reference point between the PCF 180 and an AF 130

N6: a reference point between the UPF 170 and the DN 140

N7: a reference point between the SMF 160 and the PCF 180

N8: a reference point between the UDM 153 and the AMF 150

N9: a reference point between two core UPFs 170

N10: a reference point between the UDM 153 and the SMF 160

N11: a reference point between the AMF 150 and the SMF 160

N12: a reference point between the AMF 150 and the authentication server function (AUSF) 151

N13: a reference point between the UDM 153 and the authentication server function 151

N14: a reference point between two AMFs 150

N15: a reference point between the PCF 180 and the AMF 150 for a non-roaming scenario, and a reference point between the PCF 180 and the AMF 150 in a visited network for roaming scenario In addition, hereinafter, an embodiment of the disclosure will be described using the 5G system as an example, but the embodiment of the disclosure may also be applied to other communication systems having a similar technical background. In addition, embodiments of the disclosure may also be applied to other communication systems via some modifications without significantly departing from the scope of the disclosure at the discretion of a person with skilled technical knowledge.

According to various embodiments of the disclosure, 5GC may include NFs illustrated in FIG. 1A. Of course, this is not limited to the example of FIG. 1A, and 5GC may include more or fewer NFs than the NFs illustrated in FIG. 1A.

Figure 1B:
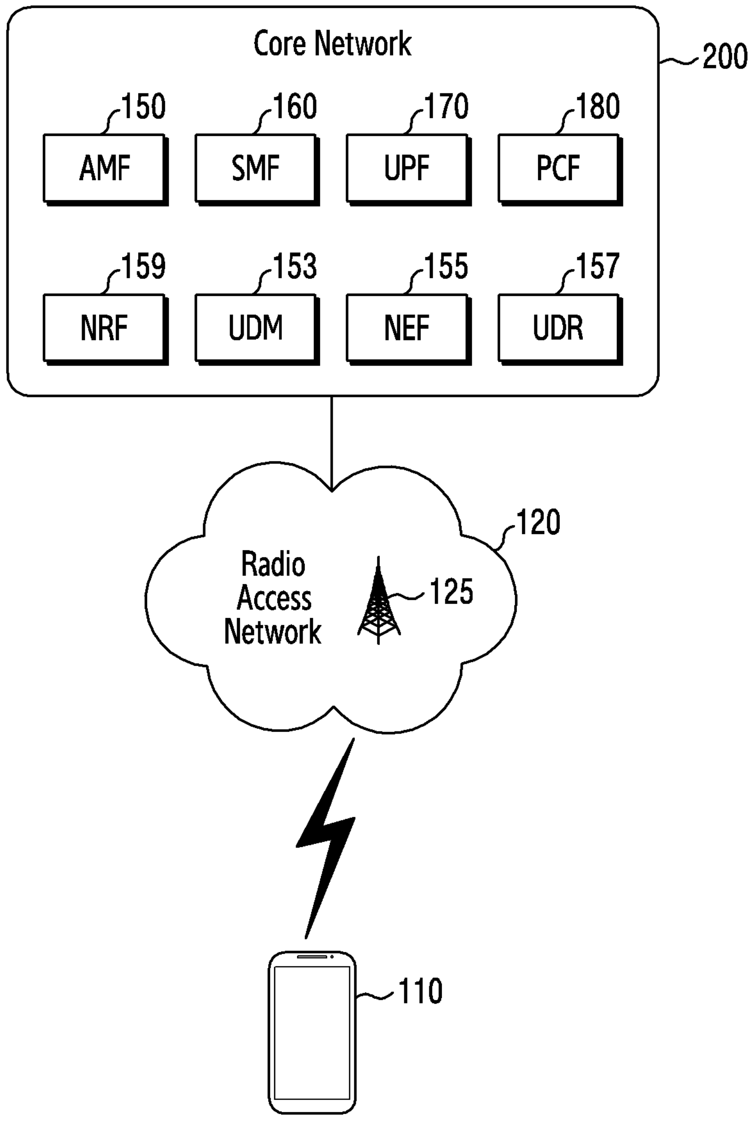
FIG. 1B illustrates a wireless environment including a core network in the wireless communication system according to an embodiment of the disclosure.

FIG. 1B illustrates a wireless environment including a core network in the wireless communication system according to an embodiment of the disclosure.

Referring to FIG. 1B, the wireless communication system includes the radio access network (RAN) 120 and a core network (CN).

The radio access network 120 is a network directly connected to the user device, for example, the terminal 110, and is an infrastructure which provides radio access to the terminal 110. The radio access network 120 may include a set of multiple base stations including a base station 125, and the multiple base stations may perform communication via interfaces established therebetween. At least some of the interfaces between the multiple base stations may be wired interfaces or wireless interfaces. The base station 125 may have a structure in which a central unit (CU) and a distributed unit (DU) are separated. In this case, a single CU may control multiple DUs. The base station 125 may be referred to as, in addition to a base station, an "access point (AP)", a "next generation node B (gNB)", a "5th generation (5G) node", a "wireless point", a "transmission/reception point (TRP)", or other terms having equivalent technical meanings. The terminal 110 may access the radio access network 120 and perform communication with the base station 125 via a wireless channel. The terminal 110 may be referred to as, in addition to a terminal, a "user equipment (UE)", a "mobile station", a "subscriber station", a "remote terminal", a "wireless terminal", a "user device", or other terms having equivalent technical meanings.

The core network is a network which manages the entire system, and the core network controls the radio access network 120 and processes data and control signals for the terminal 110, which are transmitted or received via the radio access network 120. The core network performs various functions, such as controlling a user plane and a control plane, processing mobility, managing subscriber information, charging, and interworking with other types of systems (for example, a long term evolution (LTE) system). In order to perform the various functions described above, the core network may include multiple functionally separated entities having different Nfs. For example, the core network 200 may include the AMF 150, the SMF 160, the UPF 170, the PCF 180, the NRF 159, the UDM 153, an NEF 155, and a UDR 157.

The terminal 110 may be connected to the radio access network 120 so as to access the AMF 150 which performs a mobility management function of the core network. The AMF 150 is a function or a device which is responsible for both access to the radio access network 120 and mobility management of the terminal 110. The SMF 160 is an NF which manages a session. The AMF 150 is connected to SMF 160, and the AMF 150 routes a session-related message for the terminal 110 to the SMF 160. The SMF 160 makes a connection to the UPF 170 so as to allocate a user plane resource to be provided to the terminal 110, and establishes a tunnel to transmit data between the base station 125 and the UPF 170. The PCF 180 controls information on a policy and charging for a session used by the terminal 110.

The NRF 159 stores information on NFs installed in a mobile communication operator network, and performs a function to notify of the stored information. The NRF 159 may be connected to all NFs. When starting operation in the operator network, each NF provides, by registering with the NRF 159, the NRF 159 with a notification that a corresponding NR is being operated in the network. The UDM 153 is an NF to perform a function similar to that of a home subscriber server (HSS) in a 4G network, and stores subscription information of the terminal 110 or a context used by the terminal 110 in the network.

The NEF 155 performs a function to connect a third party server and an NF in the 5G mobile communication system. For example, the NEF 155 may be a function which provides information on the terminal to a server outside the 5G network. In addition, the NEF 155 may provide information required for a service to the 5G network, so as to provide a function to store the information in the UDR. The NEF 155 serves to provide data to the UDR 157, perform updating, or acquire data. The UDR 157 performs a function to store subscription information of the terminal 110, store policy information, store data exposed to the outside, or store information required for a third party application. In addition, the UDR 157 also serves to provide the stored data to another NF.

Figure 2A:
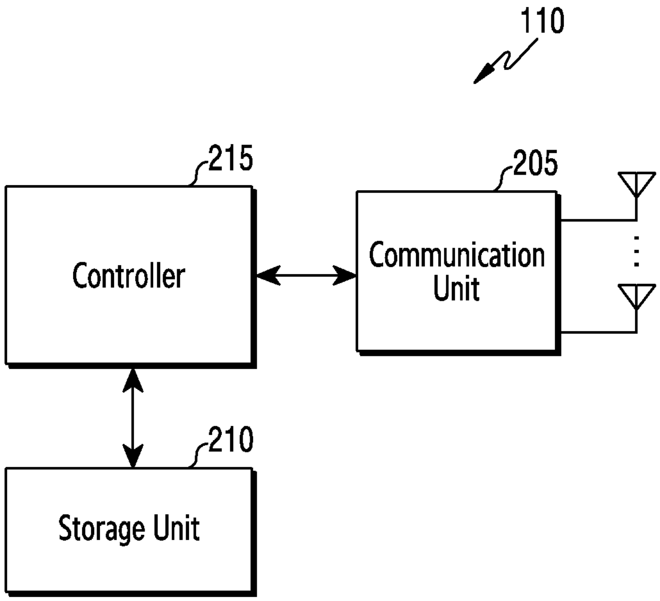
FIG. 2A illustrates an example of a functional structure of a terminal according to an embodiment of the disclosure.

FIG. 2A illustrates an example of a functional structure of a terminal according to an embodiment of the disclosure.

The configuration illustrated in FIG. 2A may be understood as a configuration of the terminal 110. The terms " . . . unit", " . . . device", etc. used hereinafter may refer to a unit configured to process at least one function or operation, and may be implemented as hardware, software, or a combination of hardware and software.

Referring to FIG. 2A, the terminal may include a communication unit 205, a storage unit 210, and a controller 215.

The communication unit 205 performs functions for transmitting or receiving a signal via a wireless channel. For example, the communication unit 205 performs a function of conversion between a baseband signal and a bitstream according to a physical layer specification of a system. For example, during data transmission, the communication unit 205 generates complex symbols by encoding and modulating a transmission bitstream. When receiving data, the communication unit 205 restores the received bitstream by demodulating and decoding the baseband signal. The communication unit 205 up-converts the baseband signal into an RF band signal, transmits the up-converted RF band signal via an antenna, and then down-converts the RF band signal received via the antenna into a baseband signal. For example, the communication unit 205 may include a transmission filter, a reception filter, an amplifier, a mixer, an oscillator, a DAC, an ADC, and the like.

In addition, the communication unit 205 may include multiple transmission or reception paths. Furthermore, the communication unit 205 may include at least one antenna array including multiple antenna elements. In terms of hardware, the communication unit 205 may include a digital circuit and an analog circuit (for example, a radio frequency integrated circuit (RFIC)). The digital circuit and the analog circuit may be implemented in a single package. In addition, the communication unit 205 may include multiple RF chains. Further, the communication unit 205 may perform beamforming.

The communication unit 205 transmits and receives a signal as described above. Accordingly, all or a part of the communication unit 205 may be referred to as "transmitter", "receiver", or "transceiver". In the following description, transmission and reception performed via a wireless channel are used in a sense including processing performed as described above by the wireless communication unit 205.

The storage unit 210 stores data, such as a basic program, an application program, configuration information, and the like for operation of the terminal. The storage unit 210 may include a volatile memory, a non-volatile memory, or a combination of a volatile memory and a non-volatile memory. The storage unit 210 provides stored data in response to a request of the controller 215.

The controller 215 controls overall operations of the terminal. For example, the controller 215 transmits and receives a signal via the communication unit 205. Further, the controller 215 records and reads data in the storage unit 210. The controller 215 may perform functions of a protocol stack required by communication standards. To this end, the controller 215 may include at least one processor or microprocessor, or may be a part of a processor. In addition, a part of the communication unit 205 and the controller 215 may be referred to as a communication processor (CP). According to various embodiments, the controller 215 may control to perform synchronization using the wireless communication network. For example, the controller 215 may control the terminal to perform operations according to various embodiments described below.

Figure 2B:
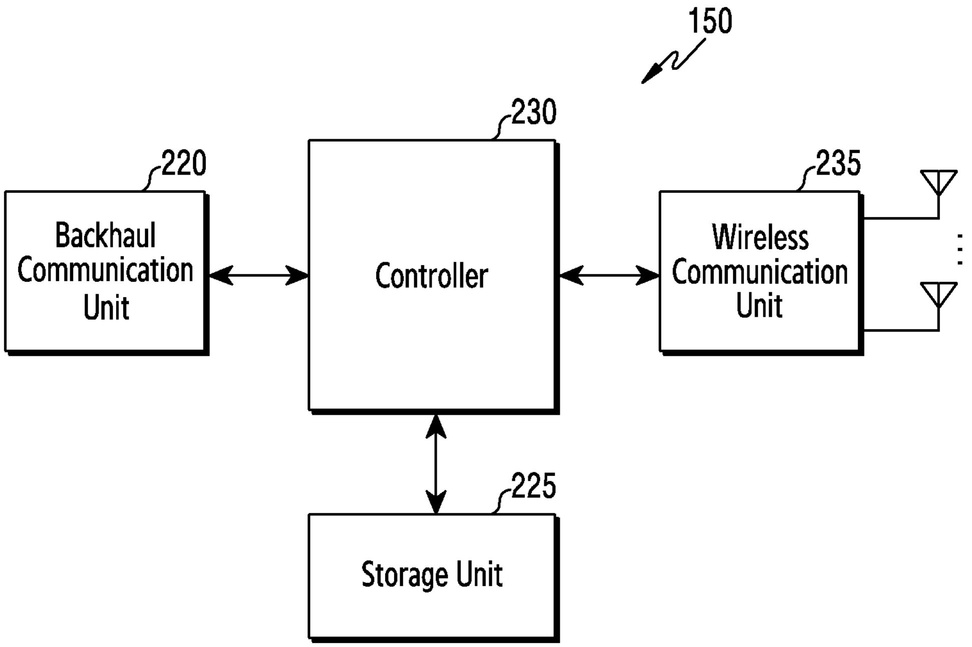
FIG. 2B illustrates an example of a functional structure of a base station according to an embodiment of the disclosure.

FIG. 2B illustrates an example of a functional structure of a base station according to an embodiment of the disclosure.

The configuration illustrated in FIG. 2B may be understood as a configuration of the base station 120. The terms " . . . unit", " . . . device", etc. used hereinafter may refer to a unit configured to process at least one function or operation, and may be implemented as hardware, software, or a combination of hardware and software.

Referring to FIG. 2B, the base station includes a wireless communication unit 235, a backhaul communication unit 220, a storage unit 225, and a controller 230.

The wireless communication unit 235 performs functions to transmit or receive a signal via a wireless channel. For example, the wireless communication unit 235 performs a function of conversion between a baseband signal and a bitstream according to a physical layer specification of the system. For example, during data transmission, the wireless communication unit 235 generates complex symbols by encoding and modulating a transmission bitstream. In addition, during data reception, the wireless communication unit 235 restores a reception bitstream by demodulating and decoding a baseband signal.

In addition, the wireless communication unit 235 up-converts a baseband signal to a radio frequency (RF) band signal, transmits the up-converted RF band signal via an antenna, and then down-converts the RF band signal received via the antenna to a baseband signal. To this end, the wireless communication unit 235 may include a transmission filter, a reception filter, an amplifier, a mixer, an oscillator, a digital-to-analog converter (DAC), an analog-to-digital converter (ADC), and the like. In addition, the wireless communication unit 235 may include multiple transmission/reception paths. Furthermore, the wireless communication unit 235 may include at least one antenna array including multiple antenna elements.

In terms of hardware, the wireless communication unit 235 may include a digital unit and an analog unit, wherein the analog unit includes multiple sub-units according to an operation power, an operation frequency, and the like. The digital unit may be implemented as at least one processor (for example, a digital signal processor (DSP)).

The wireless communication unit 235 transmits and receives a signal as described above. Accordingly, all or a part of the wireless communication unit 235 may be referred to as "transmitter", "receiver", or "transceiver". In addition, in the following description, transmission and reception performed via a wireless channel are used in a sense including processing performed as described above by the wireless communication unit 235.

The backhaul communication unit 220 provides an interface to perform communication with other nodes within a network. That is, the backhaul communication unit 220 converts, into a physical signal, a bitstream transmitted from the base station to another node, for example, another access node, another base station, a higher node, a core network, etc., and converts a physical signal received from another node into a bitstream.

The storage unit 225 stores data, such as a basic program, an application program, configuration information, and the like for operation of the base station. The storage unit 225 may include a volatile memory, a non-volatile memory, or a combination of a volatile memory and a non-volatile memory. The storage unit 225 provides stored data in response to a request of the controller 230.

The controller 230 controls overall operations of the base station. For example, the controller 230 transmits and receives a signal via the wireless communication unit 235 or the backhaul communication unit 220. In addition, the controller 230 records and reads data in the storage unit 225. The controller 230 may perform functions of a protocol stack required by the communication standard. According to another implementation example, the protocol stack may be included in the wireless communication unit 235. To this end, the controller 230 may include at least one processor. According to various embodiments, the controller 230 may control to perform synchronization using the wireless communication network. For example, the controller 230 may control the base station to perform operations according to various embodiments described below.

Figure 2C:
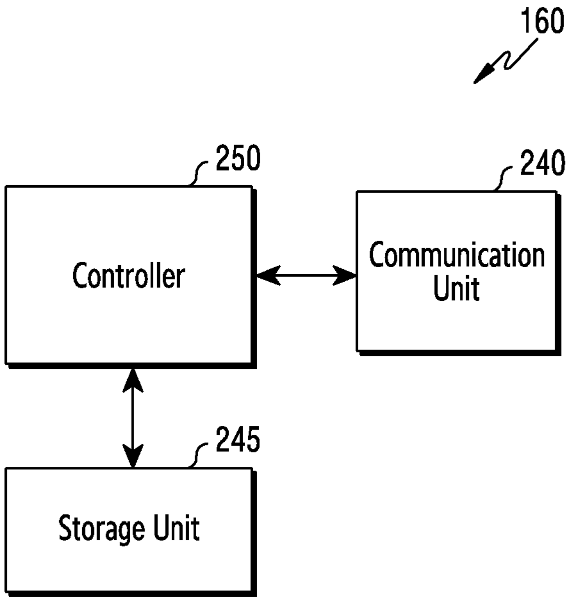
FIG. 2C illustrates an example of a functional structure of a core network entity according to an embodiment of the disclosure.

FIG. 2C illustrates an example of a functional structure of a core network entity according to an embodiment of the disclosure. Illustrated is a configuration of the core network device in the wireless communication system according to various embodiments of the disclosure.

The configuration illustrated in FIG. 2C may be understood as a configuration of a device having at least one function from among network entities including the UPF 170 of FIGS. 1A and 1B. The terms " . . . unit", " . . . device", etc. used hereinafter may refer to a unit configured to process at least one function or operation, and may be implemented as hardware, software, or a combination of hardware and software.

Referring to FIG. 2C, a core network object includes a communication unit 240, a storage unit 245, and a controller 250.

The communication unit 240 provides an interface to perform communication with other devices within the network. That is, the communication unit 240 converts, into a physical signal, a bitstream transmitted from the core network object to another device, and converts a physical signal received from another device into a bitstream. That is, the communication unit 240 may transmit or receive a signal.

Accordingly, the communication unit 240 may be referred to as a modem, a transmitter, a receiver, or a transceiver. In this case, the communication unit 240 enables the core network object to communicate with other devices or systems via a network or a backhaul connection (for example, a wired backhaul or a wireless backhaul).

The storage unit 245 stores data, such as a basic program, an application program, and configuration information for an operation of the core network object. The storage unit 245 may include a volatile memory, a non-volatile memory, or a combination of a volatile memory and a non-volatile memory. The storage unit 245 provides stored data in response to a request of the controller 250.

The controller 250 controls overall operations of the core network object. For example, the controller 250 transmits and receives a signal via the communication unit 240. Further, the controller 250 records and reads data in the storage unit 245. To this end, the controller 250 may include at least one processor. According to various embodiments of the disclosure, the controller 250 may control to perform synchronization using the wireless communication network. For example, the controller 250 may control the core network object to perform operations according to various embodiments described later.

Figure 3:
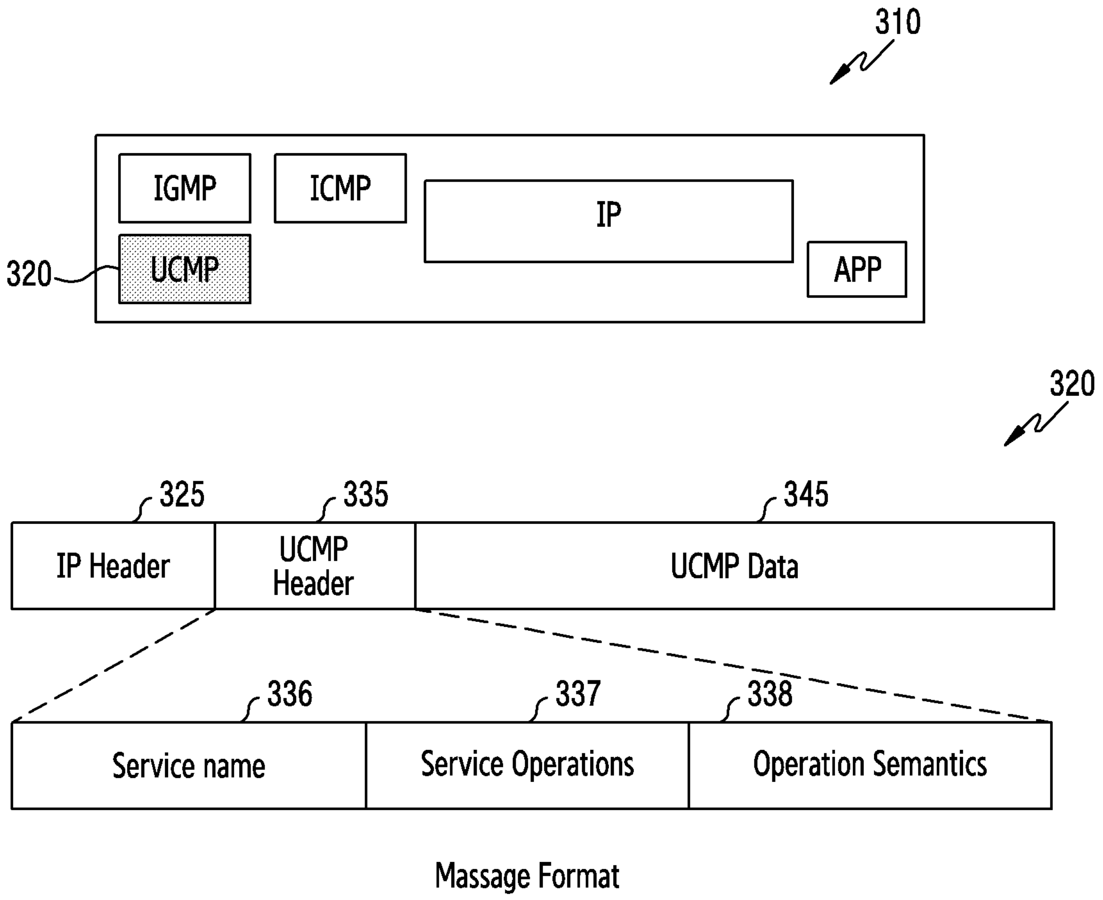
FIG. 3 illustrates an Internet protocol (IP) layer including a user plane function (UPF) control message protocol (UCMP) and a UCMP protocol message format according to an embodiment of the disclosure.

FIG. 3 illustrates an Internet protocol (IP) layer including a user plane function (UPF) control message protocol (UCMP) and a UCMP protocol message format according to an embodiment of the disclosure.

Referring to FIG. 3, an IP layer 310 including a UCMP protocol and a UCMP protocol message format 320 may be equally applied to the IPv4 standard or the IPv6 standard.

The UCMP protocol 320 may include a protocol enabling NFs to use a service provided by a UPF via a user plane (UP). The UCMP protocol 320 may be included in the IP layer 310, like an Internet group management protocol (IGMP), an Internet control message protocol (ICMP), and an address resolution protocol (ARP) protocol. The ICMP may include a protocol used to inform an Internet protocol of a network state and an error which occurs during transmission of an IP packet. The IGMP may include a protocol used to control real-time transmission of multi-cast on a subnet (local network). The ARP may include a protocol used to bind an IP address to a physical network address on a network.

According to an embodiment, the UCMP protocol 320 may include an IP header 325 and a UCMP protocol message (for example, including at least one of a UCMP header 335 or UCMP data 345). According to an embodiment, the IP header 325 included in the UCMP protocol 320 may include a specific value. The specific value included in the IP header 325 may indicate whether an IP datagram (for example, an IP transmission unit including a header and data) includes the UCMP protocol message. For example, a value of "144" may be input as a value of a protocol field of the IP header of the UCMP protocol 320 including the UCMP protocol message. Values corresponding to a UPF service name 336, service operations 337, and operation semantics 338 may be input to the UCMP header, respectively. The UCMP data 345 may include parameter values required for the UPF service.

Figure 4:
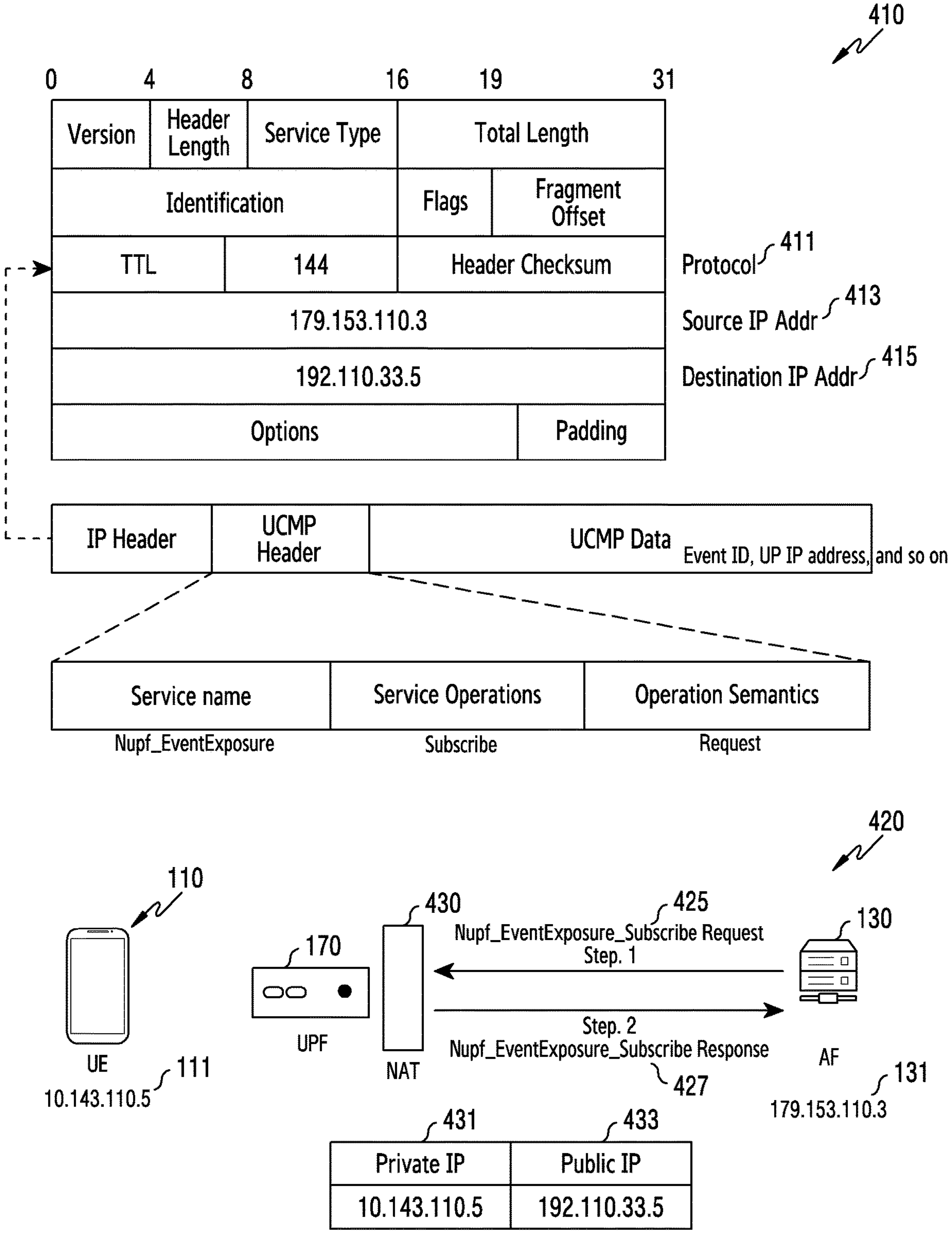
FIG. 4 illustrates an example of an operation based on a UCMP protocol according to an embodiment of the disclosure.

FIG. 4 illustrates an example of an operation based on a UCMP protocol according to an embodiment of the disclosure.

The terminal 110 may be assigned with a private IP address (for example, 10.143.110.5) 111 or 431, based on one PDU session from the UPF 170. The terminal may receive a service from an application function (AF) 130 which is an external server, based on an established PDU session. The AF 130 which provides the service to the terminal may provide the service to the terminal by using a public IP address (for example, 192.110.33.5) 433. The communication operator may control a network address translation (NAT) device 430 to change the private IP address 431 to the public IP address 433. Specifically, the NAT 430 may change the private IP address 431 assigned to the terminal to the public IP address 433 that may be used in a public network, and transmit the changed public IP address 433 to an external network. For example, the NAT may change the private IP address of the terminal, which is 10.143.110.5, to the public IP address of 192.110.33.5. Accordingly, the AF 130 outside a communication operator network may identify the IP address 111 of the terminal to be 192.110.33.5 433 which has been changed by the NAT 430.

The AF 130 which is the external server may request subscription to the UPF service in order to use a specific service of the UPF 170. The AF 130 may generate the UCMP protocol message 320 to request subscription to the UPF service, and may add the generated UCMP protocol message 320 to an IP datagram 410 so as to transmit the same. A specific value (for example, a value of "144") may be input to a protocol field 411 of an IP header to indicate that the IP datagram includes the UCMP message. A value of an IP address (for example, 179.153.110.3) 131 of the AF 130 may be input to a source IP address field 413. A value of the public IP address (for example, 192.110.33.5) 433 of the terminal 110 may be input to a destination address field 415.

According to various embodiments of the disclosure, the following values may be input to the UCMP header. According to an embodiment, a value of "Nupf_EventExposure" indicating a UPF service name may be input to a service name field. According to an embodiment, a value of "Subscribe" indicating service subscription may be input to a service operations field. According to an embodiment, a value of "Request" indicating a service request may be input to an operation semantics field. According to an embodiment, a UCMP data field may include parameter values required for a service subscription request. According to an embodiment, the parameter values included in the UCMP data field may include various values, such as an event identifier (ID), a terminal IP address, a generic public subscription identifier (GPSI), a data network name (DNN), and single-network slice selection assistance information (S-NSSAI).

According to an embodiment 420 of FIG. 4, the IP datagram generated by the AF 130 may be transmitted 425 to the PDU session anchor (PSA) UPF 170 which is a home router of the terminal. The UPF 170 may process a header of the IP datagram. The UPF 170 may identify that the IP datagram includes the UCMP message, based on the value of the protocol field (for example, 144). That is, the IP datagram generated by the AF 130 may include the UCMP message for requesting a service from the UPF 170 serving the terminal 110, instead of user data transmitted to the user (terminal) 110. The UPF 170 may identify the UCMP message and process the requested service subscription. The IP datagram processed by UPF may be discarded without being transmitted to the terminal.

According to an embodiment, the UPF 170 may transmit, to the AF 130, a result 427 of processing the requested service subscription. The UPF may generate the UCMP message to transmit the result of processing service subscription. According to various embodiments of the disclosure, the following values may be input to the UCMP header. According to an embodiment, a value of "Nupf_EventExposure" indicating a UPF service name may be input to the service name field. According to an embodiment, a value of "Subscribe" indicating service subscription may be input to the service operations field. According to an embodiment, a value of "Request" indicating a response to a service request may be input to the operation semantics field. According to an embodiment, the UCMP data field may include parameter values required for a service subscription request response.

TABLE 1

| Event ID | Consumer NF | Whether authorization is required or not | NF in charge |
|---|---|---|---|
| QoS Monitoring | AF | Required | PCF |
| Private IP address Mapping | AF | Not required | |
| IP Flow Monitoring | NWDAF, AF | Required | SMF |
| . . . | . . . | . . . | . . . |

Table 1 shows services requiring authorization from among services provided by the UPF 170. Information included in Table 1 may be updated and preconfigured or configured for the UPF 170 by an NF (for example, PCF, SMF, etc.) in charge of authorization when a UPF instance is generated. According to various embodiments of the disclosure, the information included in Table 1 is merely an example, and is not limited thereto, and more diverse UPF services may be included.

Hereinafter, according to various embodiments of the disclosure, when an NF (for example, the AF 130) requests a UPF service from the UPF 170, an operation and signaling for authorization of the service are initiated.

Figure 5:
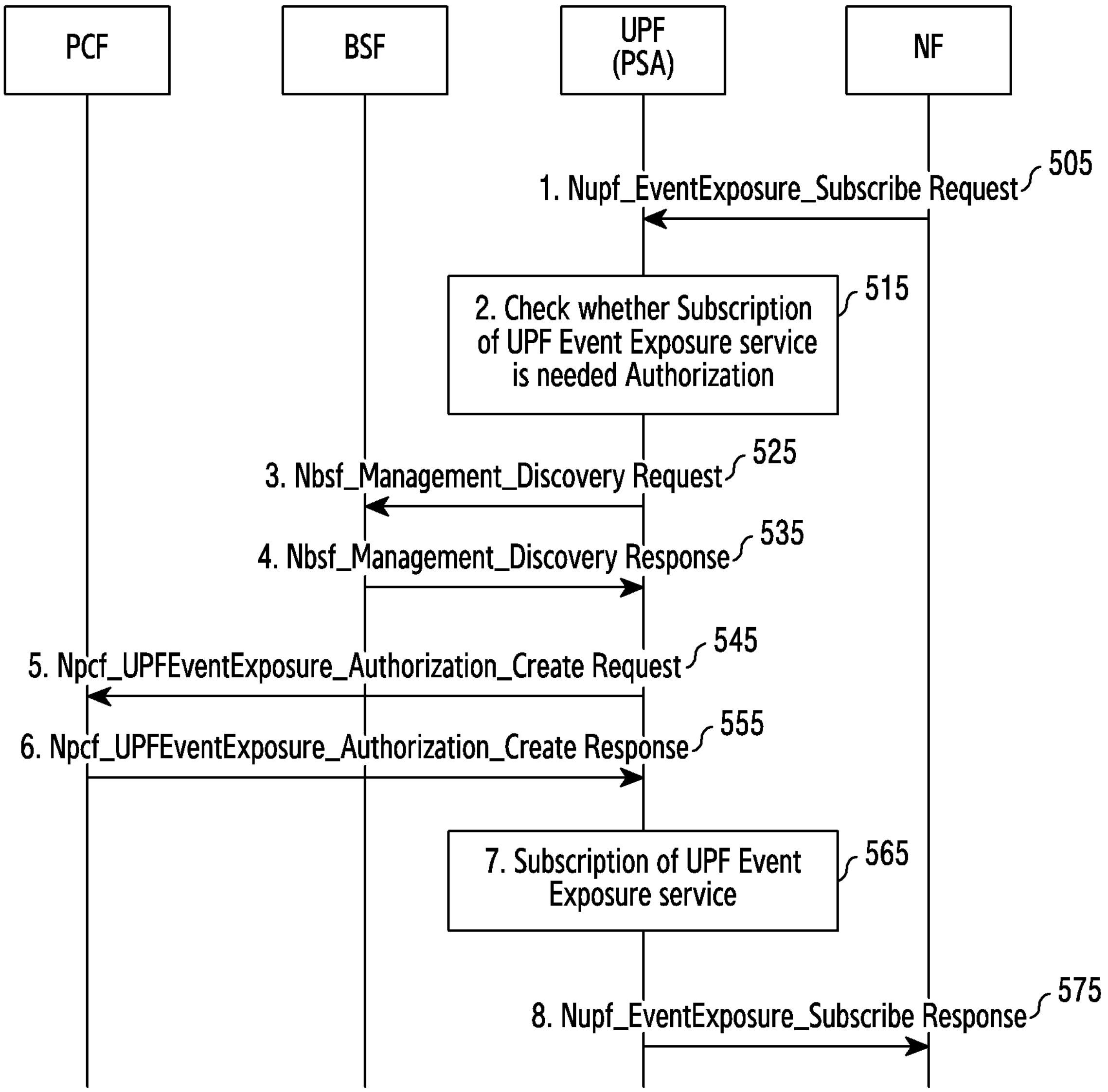
FIG. 5 illustrates a signal flow for authorization for a UPF service when the service is requested, according to an embodiment of the disclosure.

FIG. 5 illustrates a signal flow for authorization for a UPF service when the service is requested, according to an embodiment of the disclosure.

In operation 505, an NF may transmit a UPF service subscription request message to a UPF in order to use a UPF service. The UPF service subscription request message transmitted by the NF may include the information disclosed in FIG. 3 or 4.

In operation 515, the UPF may identify an event ID of the UPF service subscription request message. The UPF may identify information on the necessity of UPF service authorization configured for the UPF, based on the identified event ID. According to an embodiment, although not illustrated in FIG. 5, the UPF may previously be configured with information including the services requiring authorization, described in FIG. 4, from NFs in charge of authorization. If it is identified that the UPF service requested by the NF requires authorization, the UPF may determine an NF related to service authorization and may request, from the NF related to authorization, whether the service is provided. If it is identified that authorization is not required, the UPF may provide the NF with the UPF service requested by the NF, without an authorization identification procedure. According to various embodiments of the disclosure, it is described that the UPF service requested by the NF requires authorization, and the NF related to service authorization is a PCF. However, this is merely an example, and the NF related to service authorization may certainly include any entity in 5GC, including PCF and SMF, without limitation.

In operation 525, the UPF may transmit a search request message to a binding support function (BSF) in order to find a serving PCF among PCFs related to service authorization.

In operation 535, the BSF may transmit a search response message including information on the serving PCF to the UPF. According to an embodiment, the serving PCF may register, in the BSF, binding information related to a protocol data unit (PDU) session and a terminal. Based on this, the BSF may provide a terminal ID, a data network name (DNN), a terminal address, or a PCF address for the PDU session. However, according to various embodiments of the disclosure, the BSF is not limited to the information on the PCF, and may certainly have information on at least one other NF for authorization.

In operation 545, the UPF may transmit an authorization request message to the serving PCF in order to identify whether the requested UPF service is able to be provided to the consumer NF. The authorization request message may include parameters, such as the event ID and related information of the requested service, and an ID of the consumer NF. The PCF may determine whether to provide the UPF service to the consumer NF, based on a service level agreement (SLA) with the consumer NF, a communication operator policy, a current network situation, and the like.

In operation 555, the PCF may transmit, to the UPF via a response message, whether the requested UPF service is authorized.

In operation 565, if the PCF authorizes providing of the UPF service, the UPF may process the requested service subscription.

In operation 575, the UPF may transmit a response to a service request result to the consumer NF.

Figure 6:
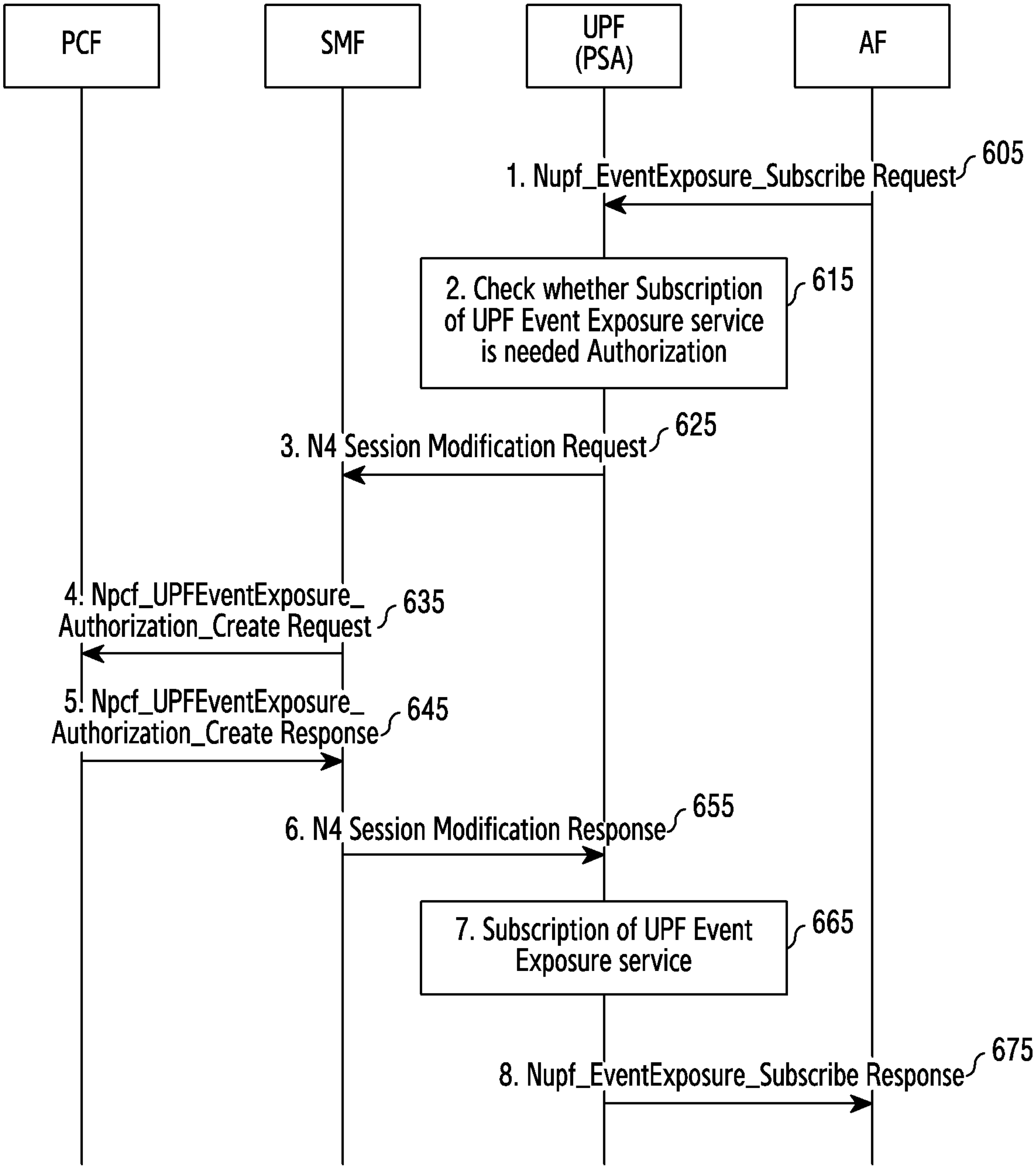
FIG. 6 illustrates another signal flow for authorization for a UPF service when the service is requested, according to an embodiment of the disclosure.

FIG. 6 illustrates another signal flow for authorization for a UPF service when the service is requested, according to an embodiment of the disclosure.

In operation 605, an NF (for example, AF) may transmit a UPF service subscription request message to a UPF in order to use a UPF service. The UPF service subscription request message transmitted by the NF may include the information disclosed in FIG. 3 or 4.

In operation 615, the UPF may identify an event ID of the UPF service subscription request message. The UPF may identify information on the necessity of UPF service authorization configured for the UPF, based on the identified event ID. According to an embodiment, although not illustrated in FIG. 6, the UPF may previously be configured with information including the services requiring authorization, described in FIG. 4, from NFs in charge of authorization. If it is identified that the requested service requires authorization, the UPF may determine an NF related to service authorization and may request, from the NF related to authorization, whether the service is provided. If it is identified that authorization is not required, the UPF may provide the requested service to the NF without an authorization identification procedure. According to various embodiments of the disclosure, it is described that the UPF service requested by the NF requires authorization, and the NF related to service authorization is a PCF. However, this is merely an example, and the NF related to service authorization may certainly include any service-related entity in 5GC, including PCF and SMF, without limitation.

In operation 625, the UPF may transmit a message to a serving SMF in order to transmit an authorization request message to a serving PCF. The message which the UPF transmits to the SMF in order to transmit the service authorization request message to the PCF may include an N4 session modification request message.

In operation 635, the SMF may transmit the authorization request message to the serving PCF in order to identify whether the requested UPF service is able to be provided to the consumer NF. The authorization request message may include parameters, such as the event ID and related information of the requested service, and an ID of the consumer NF. The PCF may determine whether to provide the UPF service to the consumer NF, based on a service level agreement (SLA) with the consumer NF, a communication operator policy, a current network situation, and the like.

In operation 645, the PCF may transmit, to the SMF via a response message, whether the requested UPF service is authorized.

In operation 655, the SMF may transmit the message received from the PCF to the UPF. The message which the SMF transmits to the UPF in order to transmit a service authorization response message may include an N4 session modification response message.

In operation 665, if the PCF authorizes providing of the UPF service, the UPF may process the requested service subscription.

In operation 675, the UPF may transmit a response to a service request result to the consumer NF.

Figure 7:
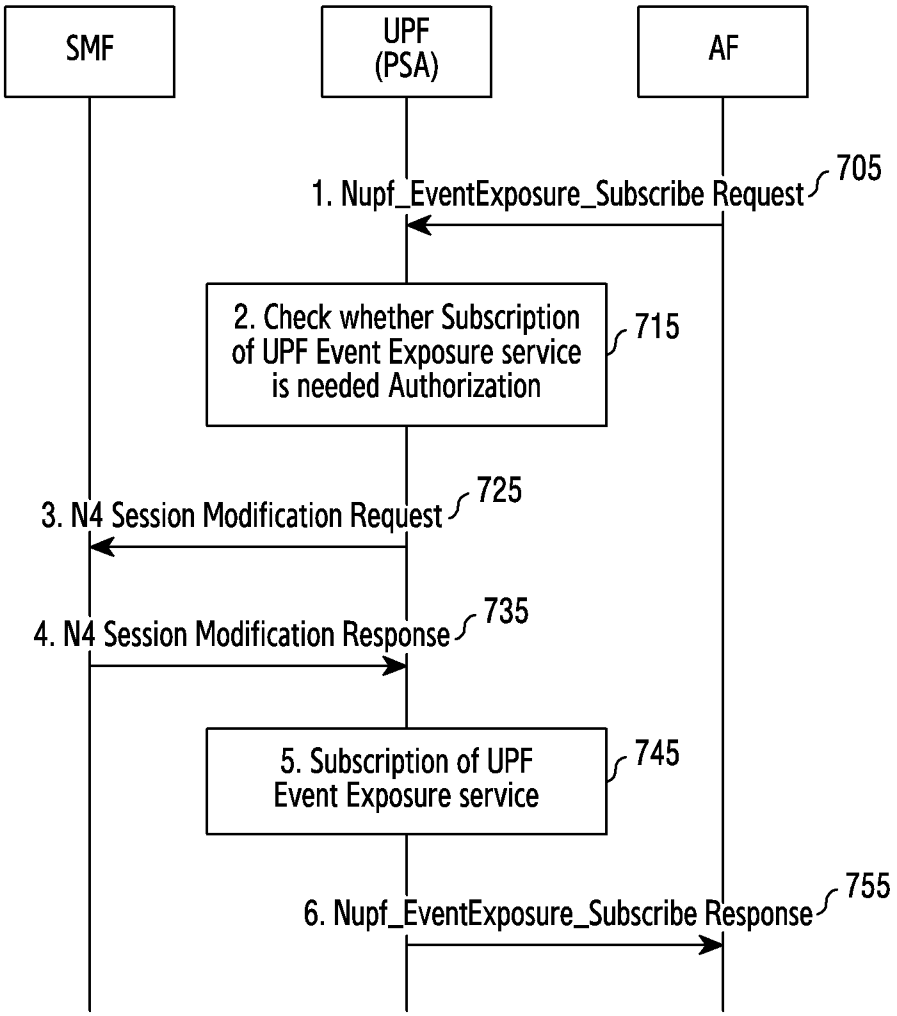
FIG. 7 illustrates a signal flow for requesting authorization for a UPF service from a session management function (SMF) when the service is requested, according to an embodiment of the disclosure.

FIG. 7 illustrates a signal flow for requesting authorization for a UPF service from a session management function (SMF) when the service is requested, according to an embodiment of the disclosure.

Specifically, FIG. 7 illustrates an operation in which an SMF determines authorization related to a UPF service requested by an NF (for example, AF).

In operation 705, the NF may transmit a UPF service subscription request message to a UPF in order to use a UPF service. The UPF service subscription request message transmitted by the NF may include the information disclosed in FIG. 3 or 4.

In operation 715, the UPF may identify an event ID of the UPF service subscription request message. The table showing the necessity of UPF service authorization configured for the UPF is checked. According to an embodiment, although not illustrated in FIG. 7, the UPF may previously be configured with information including the services requiring authorization, described in FIG. 4, from NFs in charge of authorization. If it is identified that the requested service requires authorization, the UPF may determine an NF related to service authorization and may request, from the NF related to authorization, whether the service is provided. If it is identified that authorization is not required, the UPF may provide the requested service to the NF without an authorization identification procedure. According to various embodiments of the disclosure, it is described that the UPF service requested by the NF requires authorization, and the NF related to service authorization is an SMF. However, this is merely an example, and the NF related to service authorization may certainly include any entity in 5GC, including PCF and SMF, without limitation.

In operation 725, the UPF may transmit the authorization request message to a serving SMF in order to identify whether the requested UPF service is able to be provided to the consumer NF. The message which the UPF transmits to the SMF may include an N4 session modification request message. The authorization request message may include parameters, such as the event ID and related information of the requested service, and an ID of the consumer NF. The SMF may determine whether to provide the service, based on a service level agreement (SLA) with the consumer NF, a communication operator policy, a current network situation, and the like.

In operation 735, the SMF may transmit, to the UPF via a response message, whether the requested UPF service is authorized. The message which the SMF transmits to the UPF in order to transmit a service authorization response message may include an N4 session modification response message.

In operation 745, if the SMF authorizes providing of the service, the UPF may process the requested service subscription.

In operation 755, the UPF may transmit a response to a service request result to the consumer NF.

According to various embodiments of the disclosure, the disclosure is not limited to the above-described terms or entities, and terms or entities including similar or substantially equivalent meanings may be certainly used. In addition, embodiments of the disclosure may include all, some, or a combination of some of the operations disclosed in FIGS. 5 to 7. For example, the consumer NF requesting the UPF service may include various entities including AF and NWDAF, and messages transmitted or received between the UPF and other entities may include various messages with similar functions, including the messages described in the disclosure. In addition, embodiments of the disclosure may certainly include a combination of the operations of the UPF, BSF, and SMF of FIGS. 5 to 7.

Figure 8:
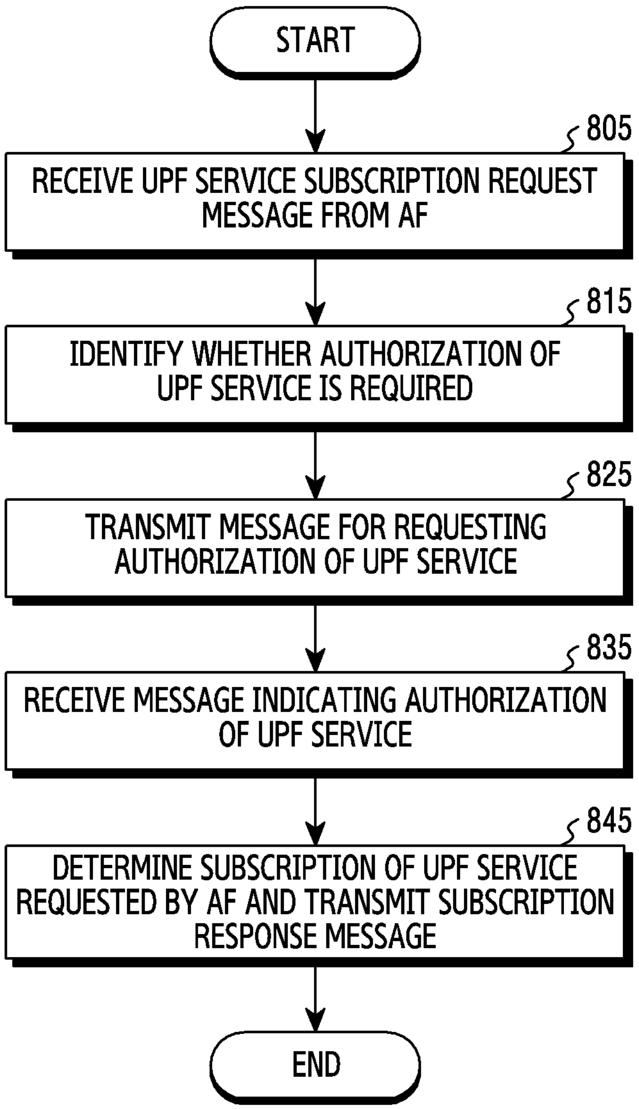
FIG. 8 illustrates an operation flow of a UPF for authorization for a UPF service when the service is requested, according to an embodiment of the disclosure.

FIG. 8 illustrates an operation flow of a UPF for authorization for a UPF service when the service is requested, according to an embodiment of the disclosure.

Specifically, referring to FIG. 8, illustrated is the UPF operation flow disclosed in FIGS. 3 to 7.

In operation 805, a UPF may receive a UPF service subscription request message from an AF. According to an embodiment, the UPF may receive the UPF service subscription request message to use a UPF service from the AF (for example, hereafter, the AF includes various NFs requesting the UPF service). The UPF service subscription request message received by the UPF may include the information disclosed in FIG. 3 or 4.

In operation 815, the UPF may identify whether authorization of the UPF service is required. According to an embodiment, the UPF may identify an event ID of the UPF service subscription request message. The UPF may identify information on the necessity of UPF service authorization configured for the UPF, based on the identified event ID. According to an embodiment, the UPF may previously be configured (preconfigured) with information including the services requiring authorization, described in FIG. 4, from NFs in charge of authorization. If it is identified that the UPF service requested by the AF requires authorization, the UPF may determine an NF related to service authorization and may generate a message for requesting (or identifying), from an NF related to authorization, whether the service is provided. If it is identified that authorization is not required, the UPF may provide the AF with the UPF service requested by the AF, without an authorization identification procedure. According to various embodiments of the disclosure, it is described that the UPF service requested by the AF requires authorization, and the NF related to service authorization is a PCF or SMF. However, this is merely an example, and the NF related to service authorization may certainly include any entity in 5GC, including PCF and SMF, without limitation.

According to various embodiments of the disclosure, before transmitting, to the NF related to authorization, a message for requesting whether the service is provided, the UPF may transmit a search request message to a BSF in order to search for the NF related to authorization. According to an embodiment, the UPF may transmit the search request message to the BSF in order to find the serving NF among NFs (for example, including PCF, SMF, etc.) related to service authorization. The UPF may receive a search response message including information on the serving NF from the BSF. According to an embodiment, a serving PCF may register, in the BSF, binding information related to a protocol data unit (PDU) session and a terminal. Based on this, the BSF may provide a terminal ID, a data network name (DNN), a terminal address, or a PCF address for the PDU session. However, according to various embodiments of the disclosure, the BSF is not limited to the information on the PCF, and may certainly have information on at least one other NF for authorization.

In operation 825, the UPF may transmit a message for requesting authorization of the UPF service. According to an embodiment, the UPF may transmit an authorization request message to the serving NF in order to identify whether the requested UPF service is able to be provided to a consumer NF. The authorization request message may include parameters, such as the event ID and related information of the requested service, and an ID of the consumer NF (for example, AF). The NF may determine whether to provide the UPF service to the consumer NF (for example, AF), based on a service level agreement (SLA) with the consumer NF (for example, AF), a communication operator policy, a current network situation, and the like.

According to an embodiment, the UPF may transmit a message to a serving SMF in order to transmit the authorization request message to the serving NF. The message which the UPF transmits to the SMF in order to transmit the service authorization request message to the PCF may include an N4 session modification request message. The SMF may transmit the authorization request message to the serving NF in order to identify whether the requested UPF service is able to be provided to the consumer NF. The authorization request message may include parameters, such as the event ID and related information of the requested service, and an ID of the consumer NF. The NF may determine whether to provide the UPF service to the consumer NF, based on a service level agreement (SLA) with the consumer NF, a communication operator policy, a current network situation, and the like.

In operation 835, the UPF may receive a message indicating authorization of the UPF service. According to an embodiment, the UPF may receive, from the NF via a response message, whether the requested UPF service is authorized.

According to an embodiment, the NF may transmit, to the SMF via the response message, whether the requested UPF service is authorized. In this case, the UPF may receive, from the SMF, the response message received from the NF. The message which the SMF transmits to the UPF in order to transmit a service authorization response message may include an N4 session modification response message.

In operation 845, the UPF may determine subscription to the UPF service requested by the AF and transmit a subscription response message. According to an embodiment, if the NF authorizes providing of the UPF service, the UPF may process the requested service subscription. According to an embodiment, the UPF may transmit a response to a service request result to the consumer NF (for example, AF).

Figure 9:
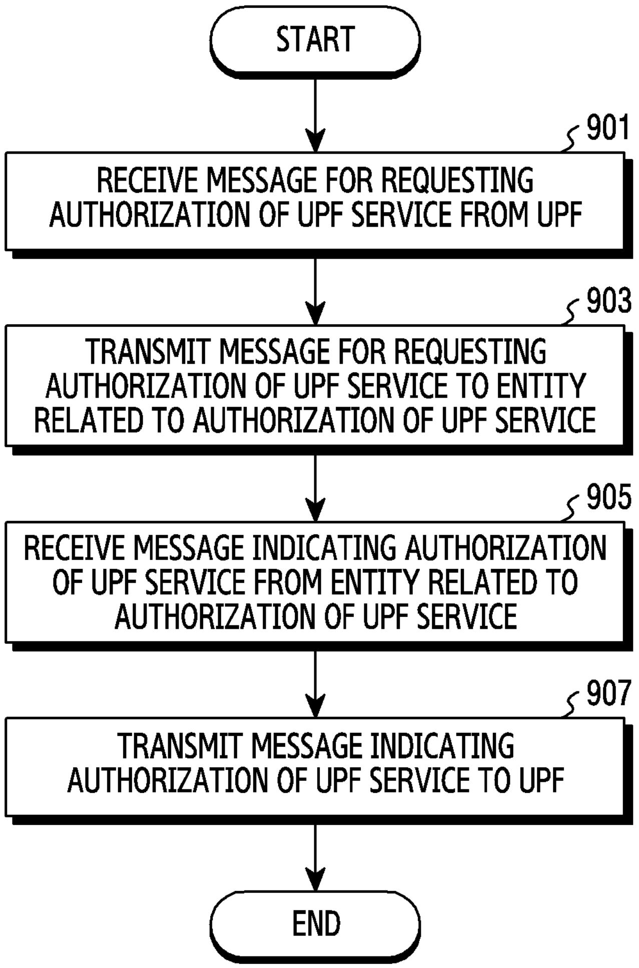
FIG. 9 illustrates an operation flow of an SMF for service authorization when a UPF service is requested, according to an embodiment of the disclosure.

FIG. 9 illustrates an operation flow of an SMF for service authorization when a UPF service is requested, according to an embodiment of the disclosure.

Specifically, referring to FIG. 9, illustrated is the SMF operation flow disclosed in FIGS. 3 to 7. According to various embodiments of the disclosure, the operations or messages disclosed in FIG. 9 may correspond to the operations or messages disclosed in FIGS. 3 to 7.

In operation 901, an SMF may receive, from a UPF, a message for requesting authorization of a UPF service. According to an embodiment, the SMF may receive, from the UPF, a message for transmission of the authorization request message to a serving NF. According to an embodiment, the message which the UPF transmits to the SMF in order to transmit the service authorization request message to the NF in charge of authorization of the UPF service may include an N4 session modification request message.

In operation 903, the SMF may transmit the message for requesting authorization of the UPF service to an entity related to authorization of the UPF service. The SMF may transmit the authorization request message to the serving NF in order to identify whether the requested UPF service is able to be provided to a consumer NF. The authorization request message may include parameters, such as an event ID and related information of the requested service, and an ID of the consumer NF. The NF may determine whether to provide the UPF service to the consumer NF, based on a service level agreement (SLA) with the consumer NF, a communication operator policy, a current network situation, and the like.

According to an embodiment, if the SMF is an entity related to authorization of the UPF service, the SMF may determine whether to provide the service, based on a service level agreement (SLA) with the consumer NF, a communication operator policy, a current network situation, and the like.

In operation 905, the SMF may receive a message indicating authorization of the UPF service from the entity related to authorization of the UPF service. According to an embodiment, the SMF may receive whether the requested UPF service is authorized, via a response message from the NF related to the UPF service.

According to an embodiment, if the SMF is an entity related to authorization of the UPF service, the SMF may directly transmit, to the UPF via a response message, whether the requested UPF service is authorized. The message which the SMF transmits to the UPF in order to transmit a service authorization response message may include an N4 session modification response message.

In operation 907, the SMF may transmit, to the UPF, a message indicating authorization of the UPF service. According to an embodiment, the SMF may transmit, to the UPF, the message received from the NF related to the UPF service. The message which the SMF transmits to the UPF in order to transmit a service authorization response message may include an N4 session modification response message.

According to various embodiments of the disclosure, a method performed by a user plane function (UPF) entity in a wireless communication system may include receiving a subscription request message for a UPF service from an application function (AF) entity, identifying whether authorization of the UPF service requested by the AF entity is required, transmitting, based on a result of the identification to a session management function (SMF) entity, a message for requesting the authorization of the UPF service requested by the AF entity, receiving, from the SMF entity, a message indicating the authorization of the UPF service requested by the AF entity, and transmitting a subscription response message for the UPF service to the AF entity, based on the message indicating the authorization.

According to an embodiment, the method may further include, in order to search for an entity related to authorization of the UPF service requested by the AF entity, transmitting, to a BSF entity, a search request message for an entity related to the determined authorization of the UPF service, receiving, from the BSF entity, a search response message including information on the entity related to authorization of the UPF service, transmitting a message for requesting authorization of the UPF service requested by the AF entity to the entity related to authorization of the UPF service, and receiving a message indicating authorization of the UPF service requested by the AF entity from the entity related to authorization of the UPF service.

According to an embodiment, the UPF entity may store, in advance, information on services requiring authorization from among services provided by the UPF entity and information on the entity configured to perform authorization.

According to an embodiment, the subscription request message for the UPF service and the subscription response message for the UPF service may include a UPF control message protocol (UCMP) header including a name of the UPF service requested by the AF entity, an indicator indicating service subscription, and an indicator indicating a service request or response.

According to an embodiment, the subscription request message for the UPF service and the subscription response message for the UPF service may include an Internet protocol (IP) header including an indicator indicating that the message includes a UCMP header, an IP address of the AF, and an IP address of a terminal to which the AF is to provide a service.

According to an embodiment, the message for requesting authorization of the UPF service may include at least one of an event identifier (ID) of the service requested by the AF, information on the service requested by the AF, or an ID of the AF.

According to various embodiments of the disclosure, a method performed by a session management function (SMF) entity in a wireless communication system may include receiving, from a user plane function (UPF), a message for requesting authorization of a UPF service requested by an application function (AF) entity, transmitting a message for requesting authorization of the UPF service to an entity related to the authorization of the UPF service, receiving a message indicating the authorization of the UPF service requested by the AF entity from the entity related to the authorization of the UPF service, and transmitting, to the UPF, the message indicating the authorization of the UPF service requested by the AF entity.

According to an embodiment, the method may further include, based on at least one of a service level agreement (SLA) with the AF entity or a current network situation, determining whether to authorize the UPF service, and based on the determination of whether to authorize the UPF service, transmitting a message indicating authorization of the UPF service to the UPF.

According to an embodiment, the method may further include providing the UPF with information including an indicator indicating a service requiring authorization from among services provided by the UPF entity and an indicator for the SMF.

According to an embodiment, the message for requesting authorization of the UPF service may include at least one of an event identifier (ID) of the service requested by the AF, information on the service requested by the AF, or an ID of the AF.

According to various embodiments of the disclosure, a user plane function (UPF) entity in a wireless communication system may include at least one transceiver, and at least one processor functionally coupled to the at least one transceiver, wherein the at least one processor is configured to receive a subscription request message for a UPF service from an application function (AF) entity, identify whether authorization of the UPF service requested by the AF entity is required, transmit, based on a result of the identification to a session management function (SMF) entity, a message for requesting the authorization of the UPF service requested by the AF entity, receive, from the SMF entity, a message indicating the authorization of the UPF service requested by the AF entity, and transmit a subscription response message for the UPF service to the AF entity, based on the message indicating the authorization.

According to an embodiment, the at least one processor may be further configured to, in order to search for an entity related to authorization of the UPF service requested by the AF entity, transmit, to a BSF entity, a search request message for an entity related to the determined authorization of the UPF service, receive, from the BSF entity, a search response message including information on the entity related to authorization of the UPF service, transmit a message for requesting authorization of the UPF service requested by the AF entity to the entity related to authorization of the UPF service, and receive a message indicating authorization of the UPF service requested by the AF entity from the entity related to authorization of the UPF service.

According to an embodiment, the UPF entity may store, in advance, information on services requiring authorization from among services provided by the UPF entity and information on the entity configured to perform authorization.

According to an embodiment, the subscription request message for the UPF service and the subscription response message for the UPF service may include a UPF control message protocol (UCMP) header including a name of the UPF service requested by the AF entity, an indicator indicating service subscription, and an indicator indicating a service request or response.

According to an embodiment, the subscription request message for the UPF service and the subscription response message for the UPF service may include an Internet protocol (IP) header including an indicator indicating that the message includes a UCMP header, an IP address of the AF, and an IP address of a terminal to which the AF is to provide a service.

According to an embodiment, the message for requesting authorization of the UPF service may include at least one of an event identifier (ID) of the service requested by the AF, information on the service requested by the AF, or an ID of the AF.

According to various embodiments of the disclosure, a session management function (SMF) entity in a wireless communication system may include at least one transceiver, and at least one processor functionally coupled to the at least one transceiver, wherein the at least one processor is configured to receive, from a user plane function (UPF), a message for requesting authorization of a UPF service requested by an application function (AF) entity, transmit a message for requesting authorization of the UPF service to an entity related to the authorization of the UPF service, receive a message indicating the authorization of the UPF service requested by the AF entity from the entity related to the authorization of the UPF service, and transmit, to the UPF, the message indicating the authorization of the UPF service requested by the AF entity.

According to an embodiment, the at least one processor may be further configured to, based on at least one of a service level agreement (SLA) with the AF entity or a current network situation, determine whether to authorize the UPF service, and based on the determination of whether to authorize the UPF service, transmitting a message indicating authorization of the UPF service to the UPF.

According to an embodiment, the at least one processor may be further configured to provide the UPF with information including an indicator indicating a service requiring authorization from among services provided by the UPF entity and an indicator for the SMF.

According to an embodiment, the message for requesting authorization of the UPF service may include at least one of an event identifier (ID) of the service requested by the AF, information on the service requested by the AF, or an ID of the AF.

It should be noted that the above-described configuration diagrams, illustrative diagrams of control/data signal transmission methods, illustrative diagrams of operation procedures, and structural diagrams are not intended to limit the scope of the disclosure. That is, all constituent elements, entities, or operation steps described in the embodiments of the disclosure should not be construed as being essential for the implementation of the disclosure, and the disclosure may be implemented without impairing the essential features of the disclosure by including only some constituent elements. In addition, the respective embodiments may be employed in combination, as necessary. For example, the methods proposed in the disclosure may be partially combined with each other to operate a network entity and a terminal.

The above-described operations of a base station or terminal may be implemented by providing any unit of the base station or terminal device with a memory device storing corresponding program codes. That is, a controller of the base station or terminal device may perform the above-described operations by reading and executing the program codes stored in the memory device by means of a processor or central processing unit (CPU).

Various units or modules of a network entity, a base station device, or a terminal device may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof. That is, it will be apparent to those skilled in the art that other variants based on the technical idea of the disclosure may be implemented. Furthermore, the above respective embodiments may be employed in combination, as necessary. For example, the methods proposed in the disclosure may be partially combined with each other to operate a base station and a terminal. Furthermore, although the above embodiments have been described by way of 5G and NR systems, other variants based on the technical idea of the embodiments may also be implemented in other systems such as LTE, LTE-A, and LTE-A-Pro systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user plane function (UPF) entity in a mobile communication system, the UPF entity comprising:

a transceiver; and a controller coupled with the transceiver, and configured to:

receive, from a network entity requesting a subscription of a UPF service, a UPF service subscription request message, wherein the UPF service subscription request message includes configuration information configuring at least one event identifier (ID) for a UPF service type, and wherein the configuration information includes information indicating whether an authorization for the at least one event ID is required and information indicating an entity associated with the authorization for the at least one event ID, identify an event ID for the UPF service among the at least one event ID, determine that an authorization of the UPF service is required based on the event ID, determine an entity associated with the authorization of the UPF service based on the event ID, transmit, to the entity associated with the authorization of the UPF service, an authorization request message for the UPF service, and receive, from the entity associated with the authorization of the UPF service, an authorization response message for the UPF service.

2. The UPF entity of claim 1, wherein, in case that the UPF service is identified as authorized based on the authorization response message, the controller is further configured to:

identify a UPF service subscription of the network entity; and transmit, to the network entity, a UPF service subscription response message associated with the UPF service subscription.

3. The UPF entity of claim 1, wherein the controller is further configured to:

transmit, to a binding support function (BSF) entity, a discovery request message for discovering a policy control function (PCF) entity based on the UPF service subscription request message;

receive, from the BSF entity, a discovery response message; and identify the PCF entity discovered based on the discovery response message as the entity associated with the authorization of the UPF service.

4. The UPF entity of claim 1, wherein the entity associated with the authorization of the UPF service is at least one of a session management function (SMF) entity or a PCF entity, wherein the authorization request message for the UPF service is an N4 session modified request message, and wherein the authorization response message for the UPF service is an N4 session modified response message.

5. The UPF entity of claim 1, wherein the UPF service subscription request message includes a UPF control message protocol (UCMP) including the at least one event ID or at least one internet protocol (IP) address.

6. A method performed by a user plane function (UPF) entity in a mobile communication system, the method comprising:

receiving, from a network entity requesting a subscription of a UPF service, a UPF service subscription request message, wherein the UPF service subscription request message includes configuration information configuring at least one event identifier (ID) for a UPF service type, and wherein the configuration information includes information indicating whether an authorization for the at least one event ID is required and information indicating an entity associated with the authorization for the at least one event ID;

identifying an event ID for the UPF service among the at least one event ID:

determining that an authorization of the UPF service is required based on the event ID;

determining an entity associated with the authorization of the UPF service based on the event ID;

transmitting, to the entity associated with the authorization of the UPF service, an authorization request message for the UPF service; and receiving, from the entity associated with the authorization of the UPF service, an authorization response message for the UPF service.

7. The method of claim 6, further comprising, in case that the UPF service is identified as authorized based on the authorization response message:

identifying a UPF service subscription of the network entity; and transmitting, to the network entity, a UPF service subscription response message associated with the UPF service subscription.

8. The method of claim 6, further comprising:

transmitting, to a binding support function (BSF) entity, a discovery request message for discovering a policy control function (PCF) entity based on the UPF service subscription request message;

receiving, from the BSF entity, a discovery response message; and identifying the PCF entity discovered based on the discovery response message as the entity associated with the authorization of the UPF service.

9. The method of claim 6, wherein the entity associated with the authorization of the UPF service is at least one of a session management function (SMF) entity or a PCF entity, wherein the authorization request message for the UPF service is an N4 session modified request message, and wherein the authorization response message for the UPF service is an N4 session modified response message.

10. The method of claim 6, wherein the UPF service subscription request message includes a UPF control message protocol (UCMP) including the at least one event ID or at least one internet protocol (IP) address.

* * * * *